United States Patent [19]
Itoh et al.

[11] 3,941,066
[45] Mar. 2, 1976

[54] METHOD FOR DISPOSAL OF WASTE SYNTHETIC HIGH POLYMER

[75] Inventors: Hayami Itoh; Mamoru Yamada; Yasuo Nozaki, all of Kobe, Japan

[73] Assignee: Kawasaki Jukogyo Kabushiki Kaisha, Kobe, Japan

[22] Filed: Mar. 3, 1972

[21] Appl. No.: 231,532

[30] Foreign Application Priority Data
Mar. 4, 1971 Japan.................................. 46-12001

[52] U.S. Cl............. 110/18 R; 260/669 R; 423/481
[51] Int. Cl.².......................................... F23G 7/00
[58] Field of Search...... 423/481, 488, 659; 23/154; 260/96 D, 92.8 A, 94.9 GC, 683 R, 669 R; 110/18 R

[56] References Cited
UNITED STATES PATENTS

| | | | |
|---|---|---|---|
| 2,248,512 | 7/1941 | Philip et al. | 260/669 |
| 2,470,361 | 5/1949 | Miller et al. | 260/669 |
| 3,220,798 | 11/1965 | Cull et al. | 423/488 X |
| 3,303,798 | 2/1967 | Kartinen et al. | 110/11 |
| 3,441,628 | 4/1969 | Ratzsch et al. | 260/683 |
| 3,445,192 | 5/1969 | Woodland et al. | 423/481 X |
| 3,572,265 | 3/1971 | Stockman | 110/18 |
| 3,589,864 | 6/1971 | Ezaki | 423/481 |
| 3,716,339 | 2/1973 | Shigaki et al. | 423/488 X |
| 3,750,600 | 8/1973 | Ohsol et al. | 110/1 |
| 3,832,151 | 8/1974 | Kitaoka et al. | 110/18 |

OTHER PUBLICATIONS

Book "Thermal Degradation of Organic Polymers" by Samuel Madorsky, 1964 Ed., pp. 98, 99, 160–163, Interscience Publishers, a Division of John Wiley & Sons, Inc., New York.

*Primary Examiner*—Delbert E. Gantz
*Assistant Examiner*—C. E. Spresser
*Attorney, Agent, or Firm*—Sughrue, Rothwell, Mion, Zinn & Macpeak

[57] ABSTRACT

Waste synthetic high polymer, especially those containing polyvinyl chloride and the like chlorine-containing synthetic resins are heated at 200°–500°C to thereby form a hot molten bath of fusible materials contained in the waste resin mixture and the chlorine-containing resins are effectively decomposed in the molten bath kept at the temperature of 200°–500°C with the generation of hydrogen chloride gas which can be recovered as hydrochloric acid.

2 Claims, 1 Drawing Figure

U.S. Patent  March 2, 1976  3,941,066
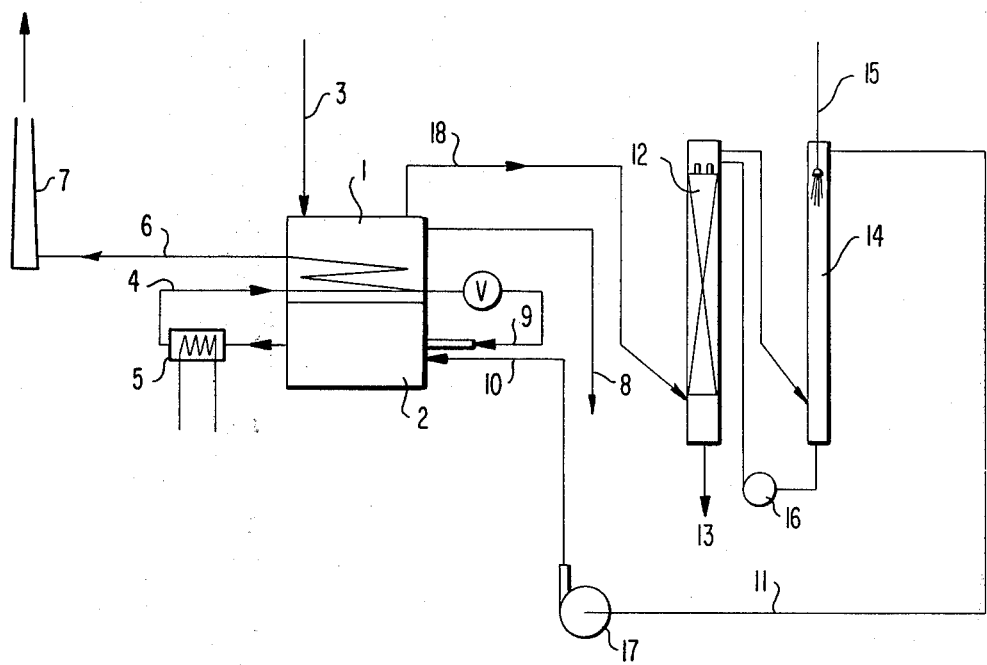

METHOD FOR DISPOSAL OF WASTE SYNTHETIC HIGH POLYMER

DETAILED DISCLOSURE OF THE INVENTION

The present invention relates to a method for the disposal of waste synthetic high polymer (hereinafter occasionally referred to as waste synthetic resins or resin wastes). In more particular, it relates to a method for the disposal of chlorine-containing resin wastes in mixture with other fusible synthetic resin wastes.

Typical examples of such chlorine-containing resins are polyvinyl chloride, copolymers of vinylidene chloride and vinyl chloride such as Saran and Kurehalon, copolymers of vinyl chloride and vinyl acetate etc. Examples of other fusible synthetic high polymer are polypropylene, polyethylene, polystyrene, polyurethane etc.

Wastes of synthetic high polymer such as polyethylene and polypropylene have heretofore been disposed by simply burning them. However, there are various difficulties encountered in such a manner of disposal since these resin wastes have such a high calorific value and remarkably low combustion rate as solid resin that they usually generate a large quantity of soot upon burning and the apparatus for burning them is rather uneconomical owing to its reduced combustion load.

There arises another problem requiring special care during the disposing operation because such resin wastes usually melt and soften at the initial stage of burning when they are burnt as solid resins.

SUMMARY OF THE INVENTION

The object of the present invention is to provide a process for the effective disposal of the waste mixtures of synthetic high polymer whereby the above-mentioned difficulties have been completely overcome and hazardous substance generated during the disposal, particularly hydrogen chloride, can be completely removed.

The method of the present invention is characterized by the operation comprising:

a. firstly heating the waste polyolefin mixture at a relatively low temperature within the range of 200°–500°C to thereby melt a relatively thermally stable synthetic high polymer such as polypropylene and polyethylene contained in the waste mixture thereby forming a hot bath consisting of the molten resins, b. decomposing thermally unstable resins, such as, for example, polyvinyl chloride and the like chlorine-containing synthetic high polymers, in the hot molten bath kept at the temperature of 200°–500°C, to thereby generate hydrogen chloride gas together with a certain amount of hydrocarbon gas while separating them from residual material consisting essentially of carbon, c. discharging the generated hydrogen chloride gas together with a small amount of hydrocarbon gas from the molten bath outside the system and simultaneously discharging the residual carbon out of the system.

Meanwhile, a portion of polypropylene, polyethylene and like waste synthetic high polymers comprising the hot molten bath are thermally decomposed into a $C_2$–$C_4$ hydrocarbon gas by being heated at a temperature of 200°–500°C, but the major proportion thereof undergo degradation and remain in the system as a molten liquid of lower viscosity which exhibits a melting point as low as 80°–135°C.

The $C_2$–$C_4$ hydrocarbon gas so generated in this stage is withdrawn from the heating furnace together with the hydrogen chloride gas generated from polyvinyl chloride and with hexane, propylene and the like hydrocarbon gases.

According to the process of this invention, it has now become possible to carry out continuous disposal of waste synthetic high polymers by successively feeding them into a heating furnace thereby effecting the thermal decomposition of polyvinyl chloride and the like chlorine-containing synthetic resin wastes in the hot molten bath while dissociating hydrogen chloride gas and residual carbon free from remaining chlorine.

The present invention is characterized in that the mixture of waste synthetic high polymers form upon heating a hot molten thermal medium of fusible resins contained in the feed resin mixture while simultaneously effecting the thermal decomposition of the chlorine-containing synthetic resin wastes in the hot thermal medium accompanied by a dehydrochlorination reaction and the disposal of the thermally fusible synthetic high polymers such as polyethylene and polypropylene which have been efficiently used as the thermal medium.

The waste disposal process of this invention has the following advantages:

a. Since the process is carried out in a complete liquid state, the waste resin mixture can be easily handled and treated for instance, by conveying it with the use of a conventional pump, and it can be burnt off at a high combustion load, e.g., by means of spray-burning, in an efficient manner as readily as in the case of burning ordinary liquid fuels.

b. Since the disposal treatment is carried out in a liquid phase, the waste synthetic resins to be disposed of can be cast in a mold and formed into suitable shapes and sizes, and the molded resin may be re-used or discarded conveniently.

c. Since the thermal medium in the hot bath contains no chlorine any more, it can be burnt off without generating any hazardous gases such as hydrogen chloride. Moreover, since it contains no chlorine it may be discarded immediately or re-used as hydrocarbon resources.

In addition, it can be burnt off in mixture with town garbages.

The process of this invention may be adapted also to the disposal of the waste synthetic resin consisting wholly of chlorine-containing resins such as polyvinyl chloride, and also to the disposal of other waste synthetic high polymer containing no chlorine, such as those containing thermosetting synthetic resins.

Depending upon the composition of the synthetic resin wastes to be disposed of, it is also possible to admix hot bath-forming materials such as polyethylene and polypropylene so as to maintain the conditions, i.e., temperature and viscosity, of the hot bath at constant values.

The present invention is explained in more detail by referring to the drawing illustrating a flowsheet of the process in which the numerals used indicate:

| | |
|---|---|
| 1: | Heating furnace |
| 2: | Combustion chamber |
| 3: | Inlet line for charging waste synthetic resins |
| 6: | Exhaust line for waste flue gas |
| 14: | Scrubber |

-continued

12: Absorber
8: Residual carbon
9: Inlet line for hot bath medium and air
10: Feed line for hydrocarbon and air Synthetic resin waste to be disposed is charged into a bathtub type heating furnace 1 through inlet line 3, and heated therein at a temperature of 200°–500°C, preferably at about 375°C, forming a hot bath of molten fusible waste resins contained in the charge stock. The lower portion of the furnace is fabricated as a burner 2 into which the molten resin contained in the heating furnace is successively fed through inlet line 9 together with air and burnt as fuel to give heat for the process. Hydrogen chloride generated in the furnace by the thermal decomposition of chlorine-containing resins is withdrawn through line 18 and passed to absorber 12 in which it is recovered as hydrochloric acid 13. Unabsorbed gas taken out of the absorber 12 is then passed to a scrubber 14 where unabsorbed hydrogen chloride is further recovered by the spray of water from sprayer 15. The recovered hydrochloric acid is recycled to the absorber 12 through pump 16. Unabsorbed gaseous effluent leaving the scrubber 14, which contains hydrocarbons generated by the thermal degradation of the waste resins, is fed to the combustion chamber 2 as fuel via lines 11 and 10 by means of a blower 17 together with air.

In the drawing, number 5 is a waste heat boiler, line 4 represents a combustion flue gas, 6 is a line for exhausting waste flue gas, line 7 is a stack, 8 is a residual carbon discarding line and 9 is an inlet line for the molten resin and air to the burner.

Hydrogen chloride-containing effluent gas issuing from the heating furnace can be used as fuel after recovery of hydrocarbons by the use of a condenser, and the hydrogen chloride obtained in the absorber can be recovered as hydrochloric acid which may be used as a chemical material or may be discarded after being neutralized with $Ca(OH)_2$, NaOH etc.

The residual carbon formed in the furnace can be used either as fuel or as carbon sources in other processes, or may be discarded if desired, after being compression-molded into suitable sizes. Since the molten thermal medium can be easily sprayed at a temperature above 150°C, it is continuously spray-burnt as fuel for heating the furnace.

What is claimed is:

1. A method for the disposal treatment of a waste synthetic high polymer at least part of which is fusible at temperatures below 500°C which comprises:
   a. heating said waste synthetic high polymer at a temperature of from 200° to 500°C to thereby melt said fusible portion thereof,
   b. decomposing the remainder of said waste synthetic high polymer in a hot molten bath formed of said melted fusible portion thereof at a temperature of from 200° to 500°C; and
   c. disposing of said hot molten bath, wherein at least a part of said hot molten bath is burned as fuel for heating the waste synthetic high polymer.

2. The method of claim 1, wherein the disposing of said hot molten bath containing said decomposed waste synthetic high polymer is by atomizing in a combustion chamber and burning.

* * * * *